(12) United States Patent
    Bowles

(10) Patent No.: US 12,583,595 B2
(45) Date of Patent: Mar. 24, 2026

(54) WING-MOUNTED MULTI-STAGE IONIC THRUSTER

(71) Applicant: Jason T. Bowles, Bothell, WA (US)

(72) Inventor: Jason T. Bowles, Bothell, WA (US)

( * ) Notice: Subject to any disclaimer, the term of this patent is extended or adjusted under 35 U.S.C. 154(b) by 0 days.

(21) Appl. No.: 19/088,487

(22) Filed: Mar. 24, 2025

(65) Prior Publication Data

US 2025/0296688 A1      Sep. 25, 2025

Related U.S. Application Data

(60) Provisional application No. 63/569,369, filed on Mar. 25, 2024.

(51) Int. Cl.
    *B64D 27/31*      (2024.01)
    *B64C 3/32*       (2006.01)
    *F03H 1/00*       (2006.01)

(52) U.S. Cl.
    CPC ................ *B64D 27/31* (2024.01); *B64C 3/32* (2013.01); *F03H 1/0037* (2013.01)

(58) Field of Classification Search
    CPC ....... B64C 23/00; B64C 23/005; B64D 27/31; B64D 27/34
    See application file for complete search history.

(56) References Cited

U.S. PATENT DOCUMENTS

| | | | |
|---|---|---|---|
| 2022/0003222 A1* | 1/2022 | Frazier | F03H 1/0043 |
| 2023/0322368 A1* | 10/2023 | Barrett | F03H 1/0037 |
| 2023/0382569 A1* | 11/2023 | Pribanic | B64U 20/20 |
| 2024/0215142 A1* | 6/2024 | Vaddi | F15D 1/12 |

OTHER PUBLICATIONS

Chu, Jennifer. News article entitled "MIT engineers fly first-ever plane with no moving parts." In MIT News [online]. Posted Nov. 21, 2018. Retrieved from the Internet: <URL:https://news.mit.edu/2018/first-ionic-wind-plane-no-moving-parts-1121>.

Bowles, Jason. Video entitled "Designing A Next-Gen Ionic Thruster! (For Flight)." In Plasma Channel [online]. Posted Sep. 17, 2022. Retrieved from the Internet: <URL:https://www.youtube.com/watch?v=nrEBoPYS4ns>.

* cited by examiner

*Primary Examiner* — Timothy D Collins
*Assistant Examiner* — Justin Michael Heston

(57) ABSTRACT

A multi-stage ionic thruster includes a voltage supply, a frame of a wing, the frame defining a first axis between a leading edge of the wing and a trailing edge of the wing and a second axis between a root of the wing and a tip of the wing, and a plurality of ionic thrusters coupled to the frame and spaced apart from each other along the first axis.

20 Claims, 4 Drawing Sheets

WING-MOUNTED MULTI-STAGE IONIC THRUSTER

CROSS-REFERENCE TO RELATED APPLICATIONS

This patent application claims the benefit of priority to U.S. Provisional Patent Application No. 63/569,369, filed on Mar. 25, 2024, the contents of which are incorporated herein by reference in their entirety.

TECHNICAL FIELD

The present disclosure relates generally to an ionic thruster and, for example, to a wing-mounted multi-stage ionic thruster (which also may be referred to as a "Bowles Series Ionic (BSI) Thruster").

BACKGROUND

Conventional aircraft propulsion systems use mechanical drives with moving parts (e.g., fans and turbines) to accelerate air, thereby generating thrust. Non-mechanical alternatives may be capable of solving one or more problems associated with conventional propulsion systems (e.g., potentially being more reliable and/or more versatile).

Electrodynamic thrust (which also may be referred to as "ionic wind") is, put simply, air flow resulting from a DC electric field. At high enough voltages, a sharp, or edged, positive electrode ionizes surrounding air molecules. The ionized (e.g., positively charged) molecules may be repelled away from the positive electrode and/or attracted to a wider ground electrode. In the process, the positively charged molecules may bump into surrounding neutral air molecules creating a flow of air (which also may be referred to as "wind") in a direction from the positive electrode towards the ground electrode.

Ionic lifters are devices that use the concept of electrodynamic thrust to generate lift. For example, a high DC voltage is applied to a thin suspended wire, causing air to flow downward towards a grounded metal body, which causes lift.

Certain non-mechanical alternatives lack sufficient thrust to weight ratio for practical implementation. Thus far, flight-capable design layouts have not been envisioned. The apparatus of the present disclosure solves one or more of the problems set forth above and/or other problems in the art.

SUMMARY

In some implementations, a multi-stage ionic thruster includes a voltage supply, a frame of a wing, the frame defining a first axis between a leading edge of the wing and a trailing edge of the wing and a second axis between a root of the wing and a tip of the wing, and a plurality of ionic thrusters coupled to the frame and spaced apart from each other along the first axis.

In some implementations, a multi-stage ionic thruster includes a voltage supply, a frame of a wing, the frame defining a first axis between a leading edge of the wing and a trailing edge of the wing and a second axis between a root of the wing and a tip of the wing, and a plurality of ionic thrusters coupled to the frame and spaced apart from each other along the first axis, wherein each ionic thruster, of the plurality of ionic thrusters, is configured to cause electrohydrodynamic thrust in a direction primarily along the first axis, wherein a total electrohydrodynamic thrust of the plurality of ionic thrusters is greater than an electrohydrodynamic thrust value of a first ionic thruster, of the plurality of ionic thrusters, wherein a positive electrode of each ionic thruster, of the plurality of ionic thrusters, is electrically connected to the voltage supply, and wherein a negative electrode of each ionic thruster, of the plurality of ionic thrusters, is electrically connected to ground.

In some implementations, a low-speed aircraft for horizontal flight includes a fuselage and a compartmentalized, non-mechanical propulsion system coupled to the fuselage, the propulsion system including a voltage supply, a frame of a wing, the frame defining a first axis between a leading edge of the wing and a trailing edge of the wing and a second axis between a root of the wing and a tip of the wing, and a plurality of ionic thrusters coupled to the frame and spaced apart from each other along the first axis, wherein each ionic thruster, of the plurality of ionic thrusters, is configured to cause electrohydrodynamic thrust in a direction primarily along the first axis, wherein a positive electrode of each ionic thruster, of the plurality of ionic thrusters, is electrically connected to the voltage supply, and wherein a negative electrode of each ionic thruster, of the plurality of ionic thrusters, is electrically connected to ground.

DETAILED DESCRIPTION

This disclosure relates to a wing-mounted multi-stage ionic thruster, which is applicable to any machine or system that uses thrust (e.g., electrohydrodynamic thrust). The term "machine" may refer to any machine that performs an operation associated with an industry such as, for example, transportation, intelligence, defense, logistics, hobby, toy, or another industry. For example, the machine may be an aerial vehicle (e.g., an aircraft or a drone) and/or other machines that include one or more wings (e.g., aerial vehicles that are fixed wing or non-fixed wing). For example, the machine may be a model airplane.

Figure 1:
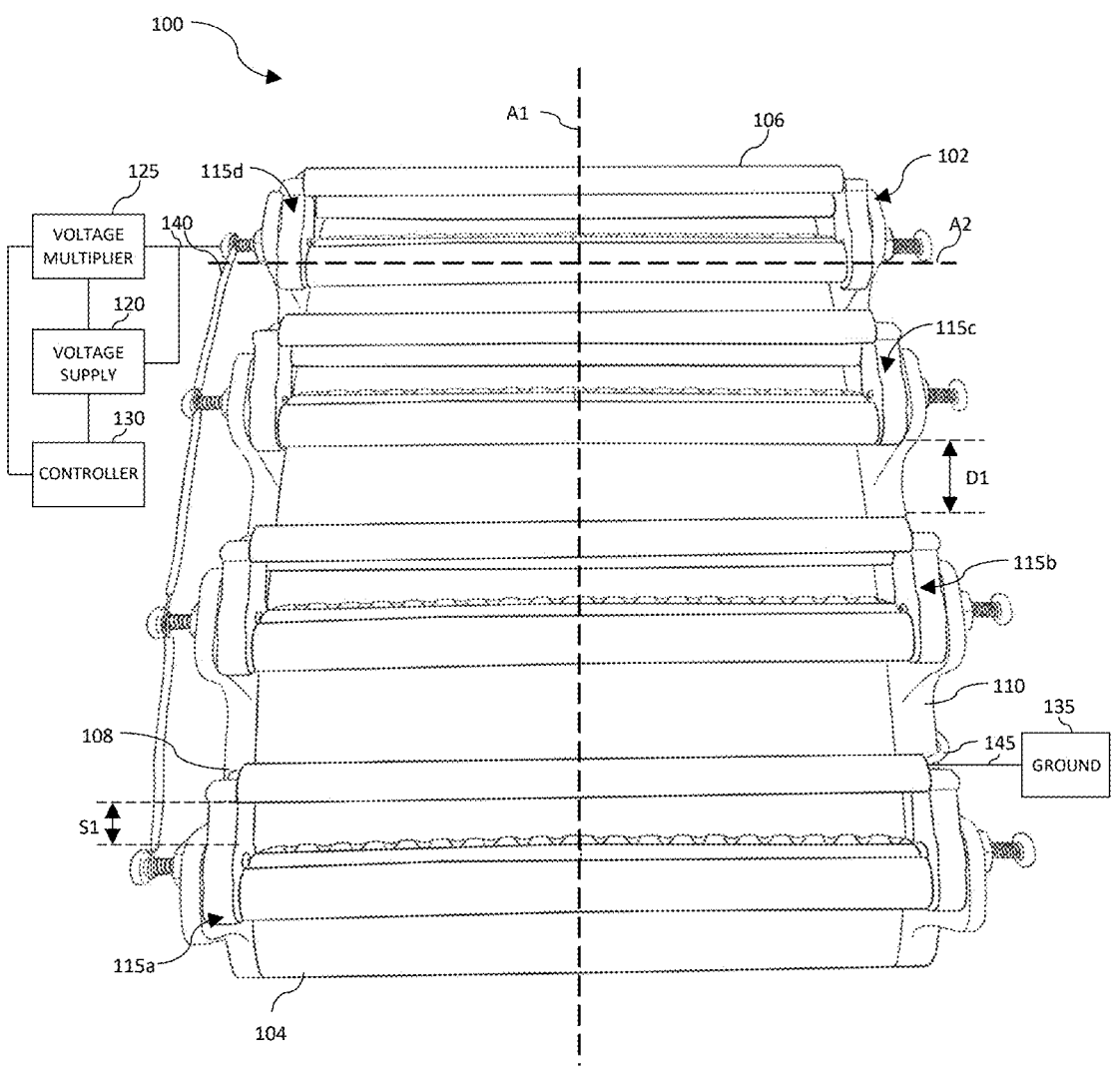
FIG. 1 is a front perspective view of an example wing-mounted multi-stage ionic thruster described herein.
Figure 2:
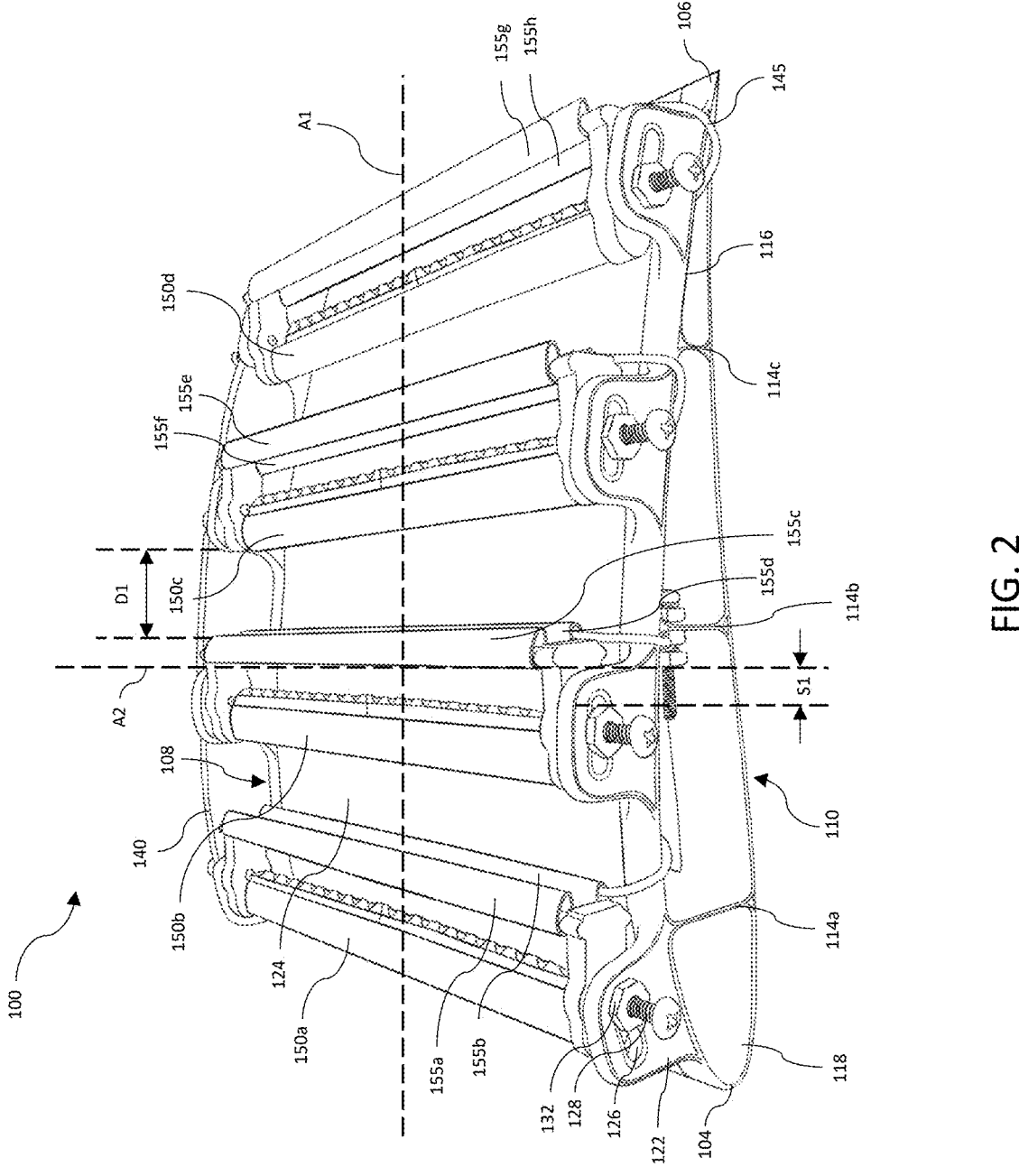
FIG. 2 is a side perspective view of an example wing-mounted multi-stage ionic thruster described herein.
Figure 3:
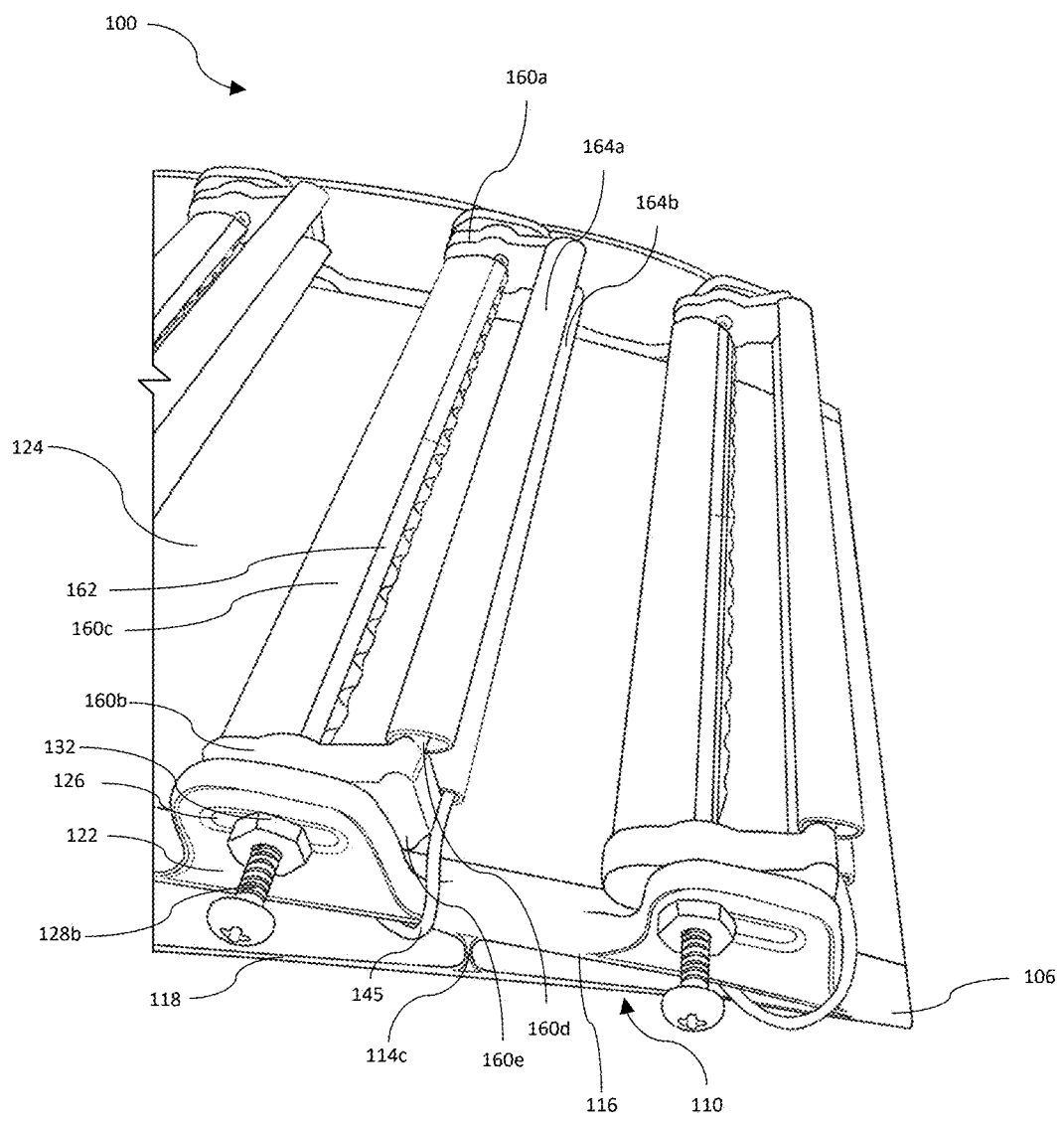
FIG. 3 is an enlarged side perspective view of a portion of an example wing-mounted multi-stage ionic thruster described herein.
Figure 4:
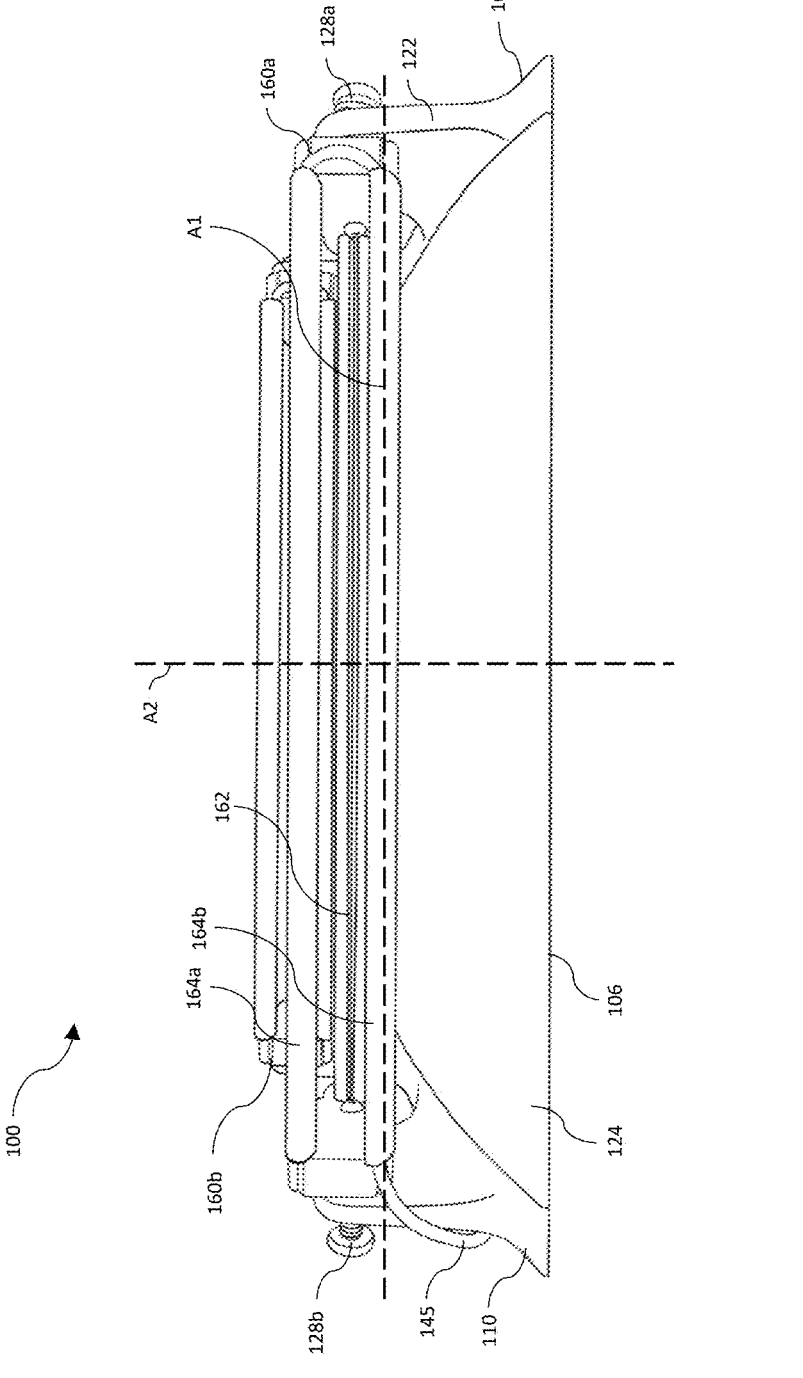
FIG. 4 is a back view of the trailing edge of an example wing-mounted multi-stage ionic thruster described herein.

FIG. 1 is a front perspective view of an example wing-mounted multi-stage ionic thruster 100 described herein. FIG. 2 is a side perspective view of an example wing-mounted multi-stage ionic thruster 100 described herein. FIG. 3 is an enlarged side perspective view of a portion of an example wing-mounted multi-stage ionic thruster 100 described herein. FIG. 4 is a back view of the trailing edge of an example wing-mounted multi-stage ionic thruster 100 described herein. In some examples, the multi-stage ionic thruster 100 may include less equipment, additional equipment, or alternative equipment compared to the examples depicted in FIGS. 1-4. Though certain aspects may not be pictured (e.g., not clearly visible) in one or more of the figures, the description herein can apply equally to all figures, without limitation. As shown in FIGS. 1-2, the multi-stage ionic thruster 100 includes a frame 102 (e.g., a frame of a wing). The frame 102 includes a leading edge 104, a trailing edge 106, a root 108 (or inboard end), and a tip 110 (or outboard end). The frame 102 defines a first axis A1 between the leading edge 104 and the trailing edge 106 and a second axis A2 between the root 108 and the tip 110. The multi-stage ionic thruster 100 includes a plurality of ionic thrusters 115 (115a-d) (which also may be referred to as "stages") coupled to the frame 102 and spaced apart from each other along the first axis A1. In some embodiments, the plurality of ionic thrusters 115 may include a total of two or more ionic thrusters, such as a total of three to five ionic thrusters, such as a total of four ionic thrusters as shown.

The multi-stage ionic thruster 100 may include a voltage supply 120 (e.g., an adjustable and/or high voltage supply, such as a 10 kV flyback), a voltage multiplier 125 (e.g., 10 kV to 60 kV) electrically connected with the voltage supply 120 and the plurality of ionic thrusters 115, a controller 130, and ground 135. In some examples, the multi-stage ionic thruster 100 may include a stand-off, or insulator, configured to electrically isolate the frame 102 and the plurality of ionic thrusters 115 from surrounding surfaces. As shown in FIG. 1, a first conductive wire 140 electrically connects the voltage supply 120 to the plurality of ionic thrusters 115. As shown in FIG. 1, a second conductive wire 145 connects to ground 135.

The frame 102 provides a mechanical support for the multi-stage ionic thruster 100. In some embodiments, the frame 102 may be integrally formed as a single unitary piece (e.g., cast). The frame 102 may include a mounting structure configured to be coupled to a machine to enable the multi-stage ionic thruster 100 to function as a propulsion system for the machine. In some examples, the frame 102 is formed from lightweight materials (e.g., plastic, such as fiber-reinforced plastic, and/or carbon fiber, among other examples) in order to increase a thrust to weight ratio of the multi-stage ionic thruster 100.

As shown in FIG. 2, the frame 102 may include a plurality of spars 114 (114a-c) that attach to both an upper portion 116 (e.g., top side) of the frame 102 and a lower portion 118 (e.g., bottom side) of the frame 102. The plurality of spars 114 may be disposed along (e.g., aligned with) the second axis A2. In some embodiments, the plurality of spars 114 may include a total of two to four spars, such as a total of three spars as shown, that are spaced apart from each other along the first axis A1. The plurality of spars 114 may be vertical spars. The plurality of spars 114 may provide mechanical support to the frame 102.

In some embodiments, to be coupled to the frame 102, the plurality of ionic thrusters 115 may be positioned over the upper portion 116 of the frame 102 as shown. For example, the plurality of ionic thrusters 115 may be coupled to the upper portion 116 (e.g., coupled directly to the upper portion 116). Alternatively, the plurality of ionic thrusters 115 may be coupled indirectly to the frame 102 (e.g., being coupled to one or more extensions 122 of the frame 102 that extend above the upper portion 116) as shown. In some embodiments, the leading edge 104, the trailing edge 106, the upper portion 116, and the lower portion 118 may be covered in a skin 124 that is positioned between the frame 102 and the plurality of ionic thrusters 115.

Each ionic thruster 115a-d may be configured to cause electrohydrodynamic thrust in a direction primarily along the first axis A1 (e.g., substantially parallel to the first axis A1). A total electrohydrodynamic thrust of the plurality of ionic thrusters 115 is greater than an electrohydrodynamic thrust value of each individual ionic thruster (e.g., 115a, 115b, 115c, or 115d). In other words, the electrohydrodynamic thrust values are additive. Each ionic thruster 115 may include a positive electrode 150 (150a-d) and one or more ground electrodes 155 (155a-h) (which also may be referred to as a "negative electrodes") spaced apart from each other along the first axis A1. For example, the respective positive electrodes 150, of each individual ionic thruster 115a-d, are positioned closer to the leading edge 104 compared to the respective one or more ground electrodes 155. For example, in reference to a first ionic thruster 115a, the one or more ground electrodes 155 include a first ground electrode 155a positioned above (e.g., in a vertical direction and/or in a direction that is perpendicular to both the first axis A1 and the second axis A2) the respective positive electrode 150a and a second ground electrode 155b positioned below (e.g., in the vertical direction and/or in the direction that is perpendicular to both the first axis A1 and the second axis A2) the respective positive electrode 150a. In some embodiments, the terms "above" and "below" can define that, along the first axis A1, the respective ground electrode (155a or 155b) is at least one of overlapping with a portion of the positive electrode 150a, not overlapping with the positive electrode 150a, or aligned with an upper or lower surface, respectively, of the positive electrode 150a. In some embodiments, a majority of air flow caused by the first ionic thruster 115a is configured to flow between the first ground electrode 155a and the second ground electrode 155b. In some embodiments, a proportion of the air flow that occurs between the first ground electrode 155a and the second ground electrode 155b can be defined, at least in part, based on a spacing (e.g., in the vertical direction and/or in the direction that is perpendicular to both the first axis A1 and the second axis A2) between the first ground electrode 155a and the second ground electrode 155b. The positive electrodes 150 of each ionic thruster 115a-d may be electrically connected together, in parallel, to the voltage supply 120 (e.g., configured to receive power to all of the plurality of ionic thrusters 115 simultaneously). In some examples, the positive electrodes 150 may be electrically connected together in series (e.g., via the first conductive wire 140). In some examples, the positive electrodes 150 may be connected, independently, to the voltage supply 120 and/or the voltage multiplier 125. Likewise, the one or more ground electrodes 155 of each ionic thruster 115a-d may be electrically connected, in parallel, to ground 135 (e.g., via second conductive wires 145 coupled to spar 114b of the frame 102 as shown in FIG. 2). In some examples, the one or more ground electrodes 155 may be electrically connected together in series. In some examples, the one or more ground electrodes 155 may be connected, independently, to ground 135.

The plurality of ionic thrusters 115 are spaced apart from each other along the first axis A1. For example, a thruster-to-thruster distance D1 may be defined, parallel to the first axis A1, between the one or more ground electrodes 155 of a first ionic thruster (e.g., 115b) and the positive electrode 150 of the next trailing ionic thruster (e.g., 115c). The distance D1 may be adjustable, for example, based on relative movement between adjacent ionic thrusters. In some examples, the distance D1 between adjacent ionic thrusters of the plurality of ionic thrusters 115 may be equal to each other. In some other examples, the distance D1 may be different from each other (e.g., staggered). For example, a first distance (e.g., near the leading edge 104 of the frame 102) may be less (which also may be referred to as "narrower") than a second distance (e.g., near a center of the frame 102), and a third distance (e.g., near the trailing edge 106 of the frame 102) may be less than the second distance (e.g., about equal to the first distance). In other words, the distance D1 may decrease from the center to the leading edge 104 and from the center to the trailing edge 106 as shown. In some examples, the second distance may be at least 2× greater than the first or third distance. In some other examples, the distance D1 may be narrower towards the leading edge 104 and greater towards the trailing edge 106, or vice versa. In general, the distance D1 may exhibit any type of variation that produces desirable electrohydrodynamic thrust output, without limitation.

As shown in FIG. 2, each ionic thruster 115*a-d* is coupled to the frame 102 via a pair of extensions 122, including a first extension at the root 108 and a second extension at the tip 110. The first and second extensions, of each pair, are aligned along the second axis A2. Each extension 122 includes a slot 126 that extends in the direction of the first axis A1. Each ionic thruster 115*a-d* includes a pair of rods 128 (e.g., threaded fasteners or pins), including a first rod coupled to a root end and a second rod coupled to a tip end. Each rod 128 extends through a respective slot 126 to be secured to the extension 122 via a stop 132 (e.g., a threaded nut or set screw). To make the thruster-to-thruster distance D1 adjustable, as described above, the stop 132 can be loosened, the rod 128 re-positioned in the slot 126, and the stop 132 tightened to secure the ionic thruster in place. This process can be repeated for each ionic thruster 115*a-d* to achieve the desired distance D1 across the plurality of ionic thrusters 115.

The positive electrode 150 and the one or more ground electrodes 155 of each ionic thruster 115*a-d* are spaced apart from each other along the first axis A1. For example, a spacing S1 may be defined, parallel to the first axis A1, between the positive electrode 150 and the one or more ground electrodes 155 of each ionic thruster 115*a-d*. Although not illustrated, the spacing S1 may be adjustable, for example, based on relative movement between the positive electrode 150 and the one or more ground electrodes 155. In some examples, the spacing S1 between electrodes of the plurality of ionic thrusters 115 may be equal to each other as shown. In some other examples, the spacing S1 may be different from each other (e.g., staggered). For example, a first spacing (e.g., near the leading edge 104 of the frame 102) may be greater (which also may be referred to as "wider") than a second spacing (e.g., near a center of the frame 102), which may be greater than a third spacing (e.g., near the trailing edge 106 of the frame 102). In other words, the spacing S1 may decrease from the leading edge 104 to the trailing edge 106 of the frame 102. In some examples, the first spacing may be at least 2× greater than the second or third spacing. In some other examples, the spacing between the positive electrode 150 and the one or more ground electrodes 155 of each ionic thruster 115*a-d* may be narrower towards the leading edge 104 of the frame 102. In general, the spacing S1 may exhibit any type of variation that produces desirable electrohydrodynamic thrust output, without limitation.

As shown in FIGS. 3-4, each ionic thruster 115*a-d* is an assembly that includes a body 160, a first conductive element 162 that defines a positive electrode, a first conductive sleeve 164*a* that defines a first ground electrode and a second conductive sleeve 164*b* that defines a second ground electrode. In some examples, the conductive element 162 is formed from a conductive material with a blade-like cross-section. The first conductive element 162 may be electrically connected to the first conductive wire 140 via the respective rod 128. To electrically isolate the first conductive element 162 from the first and second conductive sleeves 164*a-b*, the body 160 is formed from a non-conductive material (e.g., plastic or composite). In some examples, the body 160 generally may define a rectangle shape (top view). For example, the body 160 may include root and tip portions 160*a-b* extending along the first axis A1, and leading and trailing portions 160*c-e* coupled to the root and tip portions 160*a-b* and extending along the second axis A2. In some examples, all portions of the body 160 may be integrally formed as a single unitary piece (e.g., cast). In some other examples, one or more portions, or pieces, may be fastened or welded together to form the body 160.

As shown in FIG. 3, the first conductive element 162 is coupled to a trailing edge of the leading portion 160*c*, the first conductive sleeve 164*a* is coupled to an upper trailing portion 160*d*, and the second conductive sleeve 164*b* is coupled to a lower trailing portion 160*e*. In some examples, the leading portion 160*c* and the first and second conductive sleeves 164*a-b* each include an airfoil shape (side view). In some examples, the airfoil shape is more aerodynamic. In some examples, the airfoil shape can allow space for the second conductive wire 145 to pass through the respective sleeve. As shown in FIG. 4, a first rod 128*a* is coupled to the root portion 160*a* of the body 160 and a second rod 128*b* is coupled to the tip portion 160*b* of the body 160. As shown in FIG. 4, the second conductive wire 145 can include a first length of wire that passes between the root 108 and the tip 110 through the first conductive sleeve 164*a*, a second length of wire that passes between the root 108 and the tip 110 through the second conductive sleeve 164*b*, and a loop portion that connects the first and second lengths of wire.

The controller 130 (e.g., an electronic control module) may control and/or monitor operations of the multi-stage ionic thruster 100. In some examples, the multi-stage ionic thruster 100 may be remotely controlled. For example, the controller 130 may include one or more memories and one or more processors. In some examples, the one or more processors may be configured to adjust (e.g., independently) a variable electrohydrodynamic thrust caused by the plurality of ionic thrusters 115 (e.g., based on voltage or distance D1 described in more detail below). In some examples, the one or more processors may be configured to adjust a voltage received at the multi-stage ionic thruster 100 and/or adjust (e.g., independently) the distance D1 between the positive electrode 150 and the ground electrode 155 of each ionic thruster 115. In some examples, the voltage received at the multi-stage ionic thruster 100 may be adjusted via a first output voltage of the voltage supply 120 and/or a second output voltage of the voltage multiplier 125 (e.g., associated with the voltage supply 120). In some examples, the voltage received at the multi-stage ionic thruster 100 or the distance D1 may be adjusted based on operating information (e.g., an electrohydrodynamic thrust, a lift, a velocity, an acceleration, an orientation, such as a pitch, roll, and/or yaw, a vibration, a position, an elevation, and/or a power level, among other examples). In some examples, the operating information may be generated by one or more sensors associated with the multi-stage ionic thruster 100.

As indicated above, FIGS. 1-4 are provided as examples. Other examples may differ from what was described in connection with FIGS. 1-4.

INDUSTRIAL APPLICABILITY

Conventional aircraft propulsion systems use mechanical drives with moving parts (e.g., fans and turbines) to accelerate air, thereby generating thrust. Non-mechanical alternatives may be capable of solving one or more problems associated with conventional propulsion systems (e.g., potentially being more reliable and/or more versatile). However, certain non-mechanical alternatives lack sufficient thrust to weight ratio for practical implementation, and thus far, flight-capable design layouts have not been envisioned.

The multi-stage ionic thruster 100 described herein uses a lightweight structure (e.g., based on lightweight materials) in combination with multiple, aligned (e.g., stacked) ionic thrusters, or stages, to increase the thrust to weight ratio of the device. The multi-stage ionic thruster 100 is wing-mounted to be configurable with a glider type aircraft with a high wing aspect ratio. In addition, the electrode voltage and ionic thruster spacing are adjustable in order to vary the thrust output. As a result, the multi-stage ionic thruster 100 may be more efficient, more powerful, more controllable, and/or consume less energy than existing alternatives. The multi-stage ionic thruster 100 described herein may be implemented in a low-speed aircraft for horizontal flight. For example, the aircraft may include an airframe (e.g., fuselage, undercarriage, empennage, and/or wings) and a compartmentalized, non-mechanical propulsion system (e.g., embodied in the multi-stage ionic thruster 100) coupled to the airframe. The term "compartmentalized" may refer to a device with multiple stand-alone, or modular, functional units.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A multi-stage ionic thruster, comprising:
a voltage supply;
a frame of a wing, the frame defining a first axis between a leading edge of the wing and trailing edge of the wing and a second axis between a root of the wing and a tip of the wing, the frame including a plurality of extensions that extend above a top side of the frame,
wherein a first extension, of the plurality of extensions, includes a first slot extending in a direction of the first axis; and
a plurality of ionic thrusters coupled to the frame and spaced apart from each other along the first axis,
wherein a first ionic thruster, of the plurality of ionic thrusters, is coupled to the first extension by a first rod that extends through the first slot and is coupled to the first ionic thruster.

2. The multi-stage ionic thruster of claim 1,
wherein the first ionic thruster, of the plurality of ionic thrusters, includes a positive electrode and one or more ground electrodes spaced apart from each other along the first axis, and
wherein the positive electrode is positioned closer to the leading edge compared to the one or more ground electrodes.

3. The multi-stage ionic thruster of claim 2,
wherein the one or more ground electrodes include a first ground electrode positioned above the positive electrode and a second ground electrode positioned below the positive electrode, and
wherein a majority of air flow caused by the first ionic thruster is configured to flow between the first ground electrode and the second ground electrode.

4. The multi-stage ionic thruster of claim 1,
wherein a first distance, defined parallel to the first axis, between the first ionic thruster, of the plurality of ionic thrusters, and a second ionic thruster, of the plurality of ionic thrusters, is configured to be adjusted based on operating information of the multi-stage ionic thruster.

5. The multi-stage ionic thruster of claim 1, wherein the first rod is coupled to a first lateral end of the first ionic thruster.

6. The multi-stage ionic thruster of claim 1, wherein the first ionic thruster includes a common non-conductive body and a plurality of electrodes coupled to the common non-conductive body, and wherein the first rod is coupled to the first ionic thruster via the common non-conductive body.

7. The multi-stage ionic thruster of claim 6, wherein corresponding lateral ends of the plurality of electrodes are coupled to the common non-conductive body opposite the first rod.

8. The multi-stage ionic thruster of claim 7, wherein the plurality of electrodes consist of a positive electrode and a pair of ground electrodes spaced apart from the positive electrode along the first axis.

9. The multi-stage ionic thruster of claim 6, wherein the common non-conductive body includes a root portion and a tip portion, and wherein the plurality of electrodes extend between the root portion and the tip portion.

10. The multi-stage ionic thruster of claim 9, wherein the first rod is coupled to the root portion, and further comprising a second rod coupled to the tip portion.

11. A multi-stage ionic thruster, comprising:
a voltage supply;
a frame of a wing, the frame defining a first axis between a leading edge of the wing and a trailing edge of the wing and a second axis between a root of the wing and a tip of the wing; and
a plurality of ionic thrusters coupled to the frame and spaced apart from each other along the first axis, wherein each ionic thruster, of the plurality of ionic thrusters, is configured to cause electrohydrodynamic thrust in a direction primarily along the first axis, wherein a total electrohydrodynamic thrust of the plurality of ionic thrusters is greater than an electrohydrodynamic thrust value of a first ionic thruster, of the plurality of ionic thrusters, wherein a positive electrode of each ionic thruster, of the plurality of ionic thrusters, is electrically connected to the voltage supply, the positive electrode of each ionic thruster being spaced from the frame in a vertical direction to define a first air gap, wherein first and second negative electrodes of each ionic thruster, of the plurality of ionic thrusters, are electrically connected to ground, the first and second negative electrodes of each ionic thruster being stacked in the vertical direction to define a second air gap therebetween, and wherein the positive electrode of each ionic thruster is aligned, in the vertical direction, with the second air gap such that a majority of air flow caused by each ionic thruster is configured to flow through the second air gap.

12. The multi-stage ionic thruster of claim 11, wherein the voltage supply is adjustable, and wherein the electrohydrodynamic thrust caused by each ionic thruster is variable, independently from each other ionic thruster.

13. The multi-stage ionic thruster of claim 12, further comprising a controller including:

one or more memories; and one or more processors configured to independently adjust the variable electrohydrodynamic thrust caused by each ionic thruster, via adjusting, independently, a distance between the positive electrode and the first and second negative electrodes of each ionic thruster.

14. The multi-stage ionic thruster of claim 11, wherein a position, along the first axis, of a first ionic thruster, of the plurality of ionic thrusters, is repositionable via a slot defined in the frame and a rod that extends through the slot and is coupled to the first ionic thruster.

15. The multi-stage ionic thruster of claim 11, wherein a distance, along the first axis, between a first ionic thruster and a second ionic thruster, of the plurality of ionic thrusters, is configured to be adjusted based on operating information of the multi-stage ionic thruster.

16. The multi-stage ionic thruster of claim 11, wherein a first spacing, along the first axis, between the positive electrode and the first and second negative electrodes of a first ionic thruster, of the plurality of ionic thrusters, is different from a respective second spacing of one or more other ionic thrusters of the plurality of ionic thrusters.

17. A low-speed aircraft for horizontal flight, comprising:

a compartmentalized, non-mechanical propulsion system including:

a voltage supply;

a frame of a wing, the frame defining a first axis between a leading edge of the wing and a trailing edge of the wing and a second axis between a root of the wing and a tip of the wing; and a plurality of ionic thrusters coupled to the frame and spaced apart from each other along the first axis, wherein each ionic thruster, of the plurality of ionic thrusters, is configured to cause electrohydrodynamic thrust in a direction primarily along the first axis, wherein a positive electrode of each ionic thruster, of the plurality of ionic thrusters, is electrically connected to the voltage supply independently from respective positive electrodes of each other ionic thruster, and wherein a negative electrode of each ionic thruster, of the plurality of ionic thrusters, is electrically connected to ground.

18. The low-speed aircraft of claim 17, wherein each ionic thruster, of the plurality of ionic thrusters, is an stand-alone functional unit coupled with the frame by a common non-conductive body.

19. The low-speed aircraft of claim 17, wherein a position, along the first axis, of a first ionic thruster, of the plurality of ionic thrusters, is repositionable via a slot defined in the frame and a rod that extends through the slot and is coupled to the first ionic thruster.

20. The low-speed aircraft of claim 17, wherein a distance, along the first axis, between a first ionic thruster and a second ionic thruster, of the plurality of ionic thrusters, is configured to be adjusted based on operating information of the aircraft.

* * * * *